United States Patent [19]
Yamagishi et al.

[11] Patent Number: 5,336,559
[45] Date of Patent: Aug. 9, 1994

[54] MAGNETIC RECORDING MEDIUM

[75] Inventors: Hiroaki Yamagishi; Yasushi Nakano; Setsuko Kawahara; Noboru Koyama, all of Hino, Japan

[73] Assignee: Konica Corporation, Tokyo, Japan

[21] Appl. No.: 931,898

[22] Filed: Aug. 18, 1992

Related U.S. Application Data

[63] Continuation of Ser. No. 456,365, Dec. 26, 1989, abandoned.

[30] Foreign Application Priority Data

Dec. 28, 1988 [JP] Japan ............... 63-331752
Mar. 28, 1989 [JP] Japan ............... 1-77452

[51] Int. Cl.$^5$ .................... B32B 5/16; G11B 5/66
[52] U.S. Cl. .................... 428/329; 428/336;
428/694 B; 428/694 BG; 428/694 BS; 428/694 BN; 428/694 BA; 428/694 BH; 427/130; 427/131; 427/599
[58] Field of Search ............... 428/694, 900, 329, 336, 428/694 B, 694 BG, 694 BS, 694 BN, 694 BA, 694 BH; 427/48, 130, 131

[56] References Cited

U.S. PATENT DOCUMENTS

| | | | |
|---|---|---|---|
| 4,511,629 | 4/1985 | Konno et al. | 428/900 |
| 4,518,627 | 5/1985 | Foley et al. | 427/48 |
| 4,547,393 | 10/1985 | Asai et al. | 427/130 |
| 4,578,280 | 3/1986 | Greiner et al. | 427/130 |
| 4,619,856 | 10/1986 | Kamada et al. | 428/900 |
| 4,678,682 | 7/1987 | Asai et al. | 427/130 |
| 4,746,558 | 5/1988 | Shimozawa et al. | 428/694 |
| 4,844,946 | 7/1989 | Komotsu et al. | 427/130 |
| 4,863,797 | 9/1989 | Ogawa et al. | 428/900 |
| 4,963,433 | 10/1990 | Ogawa et al. | 427/131 |

Primary Examiner—Paul J. Thibodeau
Assistant Examiner—Leszek Kiliman
Attorney, Agent, or Firm—Jordan B. Bierman

[57] ABSTRACT

A magnetic recording medium is disclosed which is excellent in the electro-magnetic conversion efficiency and inhibited drop-out. The magnetic recording medium cpomprises a non-magnetic support; a non-magnetic layer comprising a carbon black and a binder and being provided on the non-magnetic support; and a magnetic layer containing ferromagnetic metal particles comprising iron and aluminum or a magnetic layer containing tabular-shaped magnetic particles having an axis of easy magnetization with the direction perpendicular to the tabular surface, in which the magnetic layer is provided on the side of the non-magnetic layer farther fron the support by wet-on-wet coating procedure and has a dry thickness of from 0.3 μm to 4.0 μm.

3 Claims, 7 Drawing Sheets

MAGNETIC RECORDING MEDIUM

This application is a continuation of application Ser. No. 07/456,365, filed Dec. 26, 1989, now abandoned.

FIELD OF THE INVENTION

This invention relates to a magnetic recording medium and particularly to a magnetic recording medium suitably applicable to video-tapes or floppy disks.

BACKGROUND OF THE INVENTION

Generally, a magnetic recording medium is manufactured in such a manner that a magnetic paint, which is prepared by uniformly dispersing a ferromagnetic powder, an abrasive, an antistatic agent such as carbon black, a lubricant, a hardener, and other additives, in a macromolecular resin material that is so-called a binder to which a solvent may suitably be added, if required, such magnetic paint is coated over a support, and dried up.

Heretofore, there has been a known magnetic recording medium comprising carbon black added in its magnetic layer containing ferromagnetic metal powder or tabular-shaped particulate magnetic material of barium-ferrite, Ba-Fe, so as to improve the abrasion resistance of the magnetic layer and to reduce the specific surface resistance.

When a magnetic recording medium contains carbon black in its magnetic layer, there is a defect that the electromagnetic conversion characteristics of the recording medium are deteriorated by worsening the surface roughness of the magnetic layer and lowering the packing density of the magnetic material.

Particularly with carbon black which is excellent in abrasion resistance and has an average particle size of not smaller than 50 mµ, the surface roughness of the magnetic layer is made greater, so that the chroma S/N of a magnetic recording medium is lowered.

On the other hand, carbon black having an average particle size of not larger than 50 mµ and an oil absorption of not less than 100 ml, which is used for reducing the specific surface resistance of a magnetic layer, is so hard to disperse in the magnetic layer, so that the orientation and packing density of the magnetic material are deteriorated to result in the lowering of the chroma output of the magnetic recording medium.

There is another known technique in which a magnetic layer which has a layer-thickness of not thinner than 4.0 µm and contains ferromagnetic metal powder or magnetic barium-ferrite particles is coated on a dried subbing layer containing carbon black.

When the layer thickness of the magnetic layer that is the upper layer is not thinner than 4.0 µm, the effect of the carbon black-containing lower layer is lost, so that the drop-out of a magnetic recording medium is increased, because the specific surface resistance of the magnetic layer is not lowered, but remains as high as dust is apt to be attracted.

The above-described technique uses the so-called wet-on-dry multilayer-coating system that is to multilayer-coat a magnetic paint over a dried lower layer. In the technique, therefore, not only the processing steps are complicated, but also the surface roughness of the subbing layer affects its magnetic layer, so that the chroma S/N of the magnetic recording medium is lowered.

SUMMARY OF THE INVENTION

The above objects of the invention are achieved by a magnetic recording medium comprising a non-magnetic support; a non-magnetic layer comprising a carbon black and a binder and being provided on the non-magnetic support; and a magnetic layer containing ferromagnetic metal particles comprising iron and aluminum or a magnetic layer containing tabular-shaped magnetic particles having an axis of easy magnetization with the direction perpendicular to the tabular surface, in which the magnetic layer is provided on the side of the non-magnetic layer farther fron the support by wet-on-wet coating procedure and has a dry thickness of from 0.3 µm to 4.0 µm.

BRIEF DESCRIPTION OF THE DRAWINGS

FIGS. 1 and 2 each schematically illustrate the outlines of the process for preparing a magnetic recording medium;

FIGS. 3 and 4 each illustrate the intensity distributions of deorienting magnetic fields;

FIG. 5 graphs the relation between the orientation ratios and the entrance magnetic field intensity of a deorienting magnetic field;

FIG. 6 graphs the relation between the orientation ratios and the exit magnetic field intensity of a non-orienting magnetic field;

FIG. 7 graphs the relation between $\sqrt{V.\eta/Hc}$ values and Hmax values;

FIG. 8 graphs the relation between $\sqrt{V.\eta/Hc}$ values and H'min values; and FIGS. 9 and 10 each graph the relation between $\sqrt{V.\eta/Hc}$ values and orientation ratios.

DETAILED DESCRIPTION OF THE INVENTION

Figure 1:
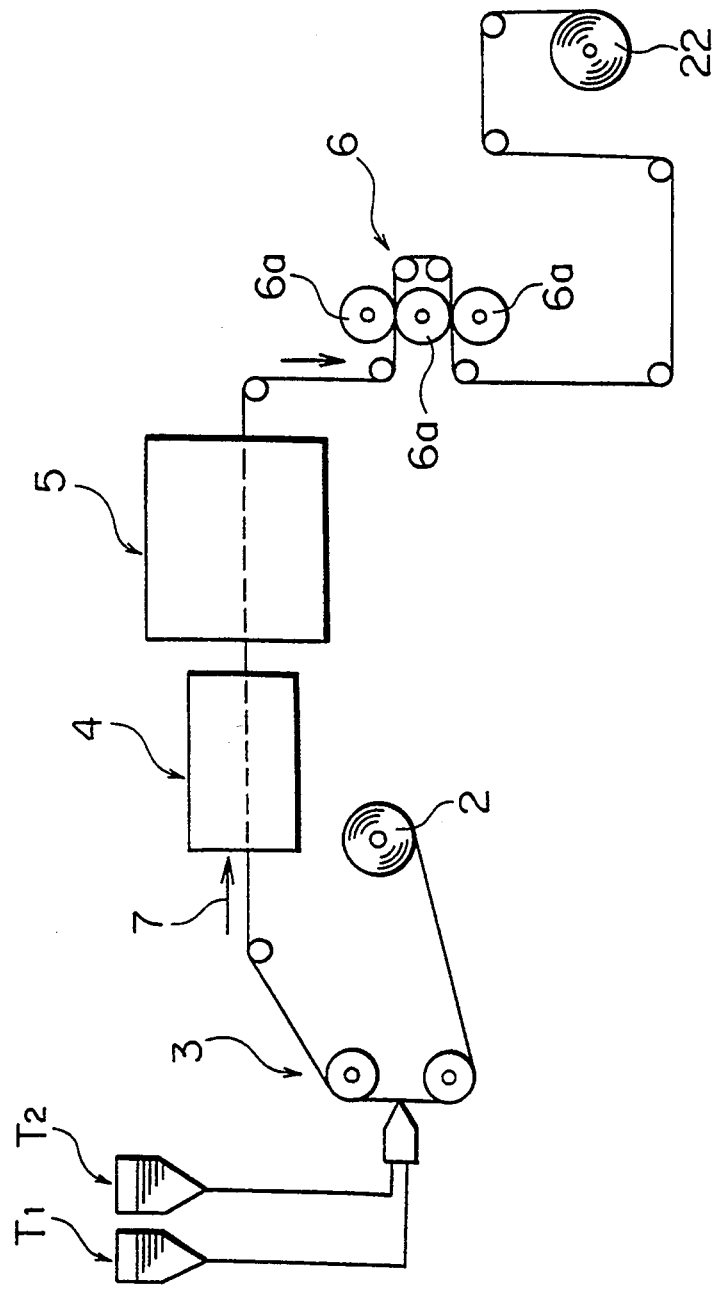
FIGS. 1 through 10 each illustrate the examples of the invention.

There have been proposed for various types of powder-formed ferromagnetic materials applicable to the above-described magnetic recording media. They are, for example, oxide magnetic materials including $\gamma$-$Fe_2O_3$, Co-$\gamma$-$Fe_2O_3$ such as Co-containing $\gamma$-$Fe_2O_3$ or Co-adhering $\gamma$-$Fe_2O_3$, $Fe_3O_4$, Co-$\gamma$-$Fe_3O_4$ such as Co-containing $Fe_3O_4$ or Co-adhering $Fe_3O_4$, and $CrO_2$; and, besides, magnetic metal powder comprising Fe or Ni, or principally comprising Fe, Ni, or Co, such as an alloy of Fe-Ni, Fe-Co, Fe-Ni-P, Fe-Ni-Co, Fe-Mn-Zn, Fe-Ni-Zn, Fe-Co-Ni-Cr, Fe-Co-Ni-P, Co-P, or Co-Cr. For the additives to the magnetic metal materials, the elements such as Si, Cu, Zn, Al, P, Mn and Cr or the compounds thereof may be used.

An inevitable requirement for the magnetic materials of magnetic recording media of the invention is to use ferromagnetic Fe-Al powder or tabular-shaped magnetic particles having an axis of easy magnetization being approximately vertical to the tabular face.

The expression, 'tabuar-shaped magnetic particles having an axis of easy magnetization being approximately vertical to the tabular face' used in the invention, include, for example, hexagonal system ferrites. Such hexagonal system ferrite magnetic material comprises barium ferrite, strontium ferrite, or the like. A part of the iron thereof may be substituted with the other element such as Ti, Co, Zn, In, Mn, Ge, or Hb. Such ferrites magnetic materials are detailed in IEEE Trans. on MAG-18 16 (1982).

Any of the aforementioned well-known magnetic materials, together with the above inevitably required components, may be contained in a magnetic layer, provided, the effects of the invention shall not be lost.

Polyurethane resin may be given as a binder applicable to the invention.

Such polyurethane resin is high in adhesive property to other materials, resistive against stress and bending force each repeatedly applied, rigid mechanically, and excellent in abrasion and weather resistance.

When using both of a cellulose resin and a vinyl chloride copolymer in combination as well as with the polyurethane resin, the dispersibility of the magnetic powder contained in a magnetic layer can be improved to enhance the mechanical strength. However, the layer is too hardened to use when using only the cellulose resin and vinyl chloride copolymer. This disadvantage can be overcome by making the polyurethane resin present.

For the cellulose resins, cellulose ether, a cellulose inorganic acid ester, and cellulose organic acid ester may be used. It is also permitted that the polyurethane resins and the vinyl chloride copolymers may partially be hydrolyzed.

Such vinyl chloride copolymers preferably include a copolymer of vinyl chloride/vinyl acetate, or a copolymer of vinyl chloride/vinyl acetate/vinyl alcohol.

For the vinyl chloride resin, vinyl chloride-vinyl acetate copolymer, and polyurethane resin, the modified matters thereof containing a functional group, especially an anionic functional group are particularly preferable.

Besides the above, a phenoxy resin may also be used. The phenoxy resin has the advantages such as the excellent mechanical strength, dimensional stability, heat resistance, water resisting property, chemical resisting property, and adhesive property.

The advantages can remarkably enhance the physical stability of a magnetic recording madium when it is allowed to stand, because the phenoxy resin and the polyurethane resin can mutually compensate for the disadvantages of one by the advantages of the other.

Besides the aforegoing binders, a thermoplastic resin, the mixture thereof with a thermosetting resin, a reaction type resin, or an electron beam setting type resin may also be used.

With the purpose of improving the durability of the magnetic layer of a magnetic recording medium of the invention, magnetic paints may contain varios kinds of hardeners such as isocyanates.

Aromatic isocyanates include, for example, tolylene diisocyanate, TDI, and the addition products of isocyanate and active hydrogen compounds. The average molecular weight thereof is suitably within the range of 100 to 3,000.

Aliphatic isocyanates include, for example, hexamethylene diisocyanate, HMDI, and the addition products of isocyanate and active hydrogen compound. Among these aliphatic isocyanates and the addition products of these isocyanates and the active hydrogen compounds, those having a molecular weight within the range of 100 to 3,000 are preferable. Among the apliphatic isocyanates, non-alicyclic isocyanates and the addition products of these compounds and active hydrogen compounds are preferable.

To the magnetic paints used to produce the above-described magnetic layer, a dispersant is applied, and additives such as a lubricant, an abrasive, a matting agent, and an antistatic agent may also be added.

Such dispersants applicable to the invention include, for example, phosphoric acid ester, amine compound, alkyl sulfate, fatty acid amide, higher alcohol, polyethylene oxide, sulfosuccinic acid, sulfosuccinic acid ester, and known surfactants and the salts thereof. Besides the above, the salts of polymeric dispersant having an anionic organic-group such as —COOH may also be used. These dispersants may be used independently or in combination.

The lubricants applicable to the invention include, for example, silicone oil, graphite, carbon black, graft polymer, molybdenum disulfide, tungsten disulfide, lauric acid, myristic acid, and fatty acid ester that is so-called wax comprising monobasic fatty acid having 12 to 16 carbon atoms and monovalent alcohol, totaling to 21 to 23 carbon atoms. These lubricants may be added in an amount within the range of 0.2 to 20 weight parts to 100 weight parts of a binder.

For the abrasives, the materials usually applicable to this purpose may be used. They include, for example, various types of alumina such as fused alumina and α-alumina, silicon carbide, chromium oxide, corundum, artificial corundum, artificial diamond, garnet, and emery principally comprising corundum and magnetite. These abrasives having an average particle size within the range of 0.05 to 5 μm and preferably 0.1 to 2 μm are used. They are added in an amount within the range of 1 to 20 weight parts to 100 weight parts of a binder used.

For the matting agents, organic and inorganic powder may be used independently or in the mixture thereof.

For the organic powder applicable to the invention, acryl styrene resin, benzoguanamine type resin powder, melamine type resin powder, and phthalocyanine type pigment are preferably used and, besides, polyolefin type resin powder, polyester type resin powder, polyamide type resin powder, polyimide type resin powder, and polyfluoroethylene resin powder may also be used.

For the inorganic powder, silicon oxide, titanium oxide, aluminium oxide, calcium carbonate, barium slfate, zinc oxide, tin oxide, chromium oxide, silicon carbide, α-$Fe_2O_3$, talc, kaolin, calcium sulfate, boron nitride, zinc fluoride, and molybdenum dioxide may be used.

It has been known so far that an antistatic agent such as those given below are contained in a magnetic layer. The antistatic agents include, for example, conductive powder such as graphite, a tin oxide-antimony oxide type compound and titanium oxide-tin oxide-antimony oxide compound as well as carbon black; natural surfactants such as saponin; nonionic surfactants such as those of alkylene oxide type, glycerol type and glycidol type; cationic surfactants such as higher alkylamines, quaternary ammonium salts, pyridine and other heterocyclic compounds, and phosphoniums or sulfoniums; anionic surfactants containing an acid group such as carboxylic acid group, sulfonic acid group, phosphoric acid group, sulfuric acid ester group, and phosphoric acid ester group; and amphoteric surfactants such as amino acids, aminosulfonic acids, and sulfuric or phosphoric acid esters of amino alcohol.

In the invention, a support is provided thereon with a layer comprising the foregoing binder and carbon black.

Generally, it is desirable to use carbon black in an amount within the range of 40 to 140 weight parts to 100 weight parts of a binder used.

It is preferable that the thickness of the above-mentioned layer is of the order of 1.0 μm.

The above-mentioned layer may also contain, as well as carbon black, the foregoing antistatic agent and any known additives for improving the abrasion resistance and reducing the specific surface resistance of a magnetic layer.

Solvents which are to be compounded into a magnetic paint, or solvents which are to be used as a diluent when coating the paint on, include, for example, ketones such as acetone, methylethyl ketone, methylisobutyl ketone and cyclohexanone; alcohols such as methanol, ethanol, propanol and butanol; esters such asmethyl acetate, ethyl acetate, butyl acetate, ethyl lactate and ethyleneglycol monoacetate; ethers such as glycoldimethyl ether, glycolmonoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene.

The supports include, for example, polyester films such as those made of polyethyleneterephthalate and polyethylene-2,6-naphthalate; polyolefin films such as those made of polypropylene; cellulose derivative films such as those made of cellulose triacetate and cellulose diacetate; and plastic films such as those made of polyamide and polycarbonate. Besides the above, metal plates such as those made of Cu, Al and Zn:and ceramic plates such as those made of glass, boron nitride and Silicon carbide may also be used.

The thicknesses of such supports are of the order of 3 to 100 μm and preferably 5 to 50 μm when they are in the form or film or plate, and are of the order of 30 μm to 10 mm when they are in the form of disk or card. When they are in the form of drum, they are used in the cylindrical form, and the form of the support is determined to meet the type of a recorder used.

It is also permitted to interpose an interlayer between the support and the magnetic layer so that adhesive property may be improved.

The coating methods available for forming the abovementioned magnetic layer on a support include, without limitation, an air-doctor coating method, a blade coating method, an air-knife coating method, a squeeze coating method, an impregnation coating method, a reverse-control coating method, a transfer-roll coating method, a gravure coating method, a kiss coating method, a cast coating method, a spray coating method, and an extrusion coating method.

In the case of forming a magnetic layer on a support in the above-given methods, there are two different coating systems available; namely, one coating system that is so-called a wet-on-dry coating system in which each layer is laminated on in order in each coating-and-drying coating process, and the other coating system that is so-called a wet-on-wet coating system or a wetting multilayer-coating system in which a layer remaining undried and wet is laminated thereon with the following layer simultaneously or succesively. In the case of preparing the magnetic recording media of the invention, such layers are simultaneously multi-coated in the wet-on-wet multilayer-coating system.

When an Fe-Al type magnetic substance or hexagonal barium ferrite is used in the upper magnetic layer provided on the carbon black-containing lower layer, which are of the constitution of the invention, a sliding noise problem is liable to raise, though a high chroma output and a high lumi S/N may be obtained.

The problem is raised due to the fact that the surface of the magnetic layer is so smoothened that the friction between the surface thereof and the tip of a head is increased.

As the result, an S/N is liable to be lowered. When the wet-on-wet coating system is carried out, a sliding noise may be lowered.

The cause of this fact may be considered to be that, when preparing a magnetic recording medium in which the raw materials and thicknesses of the upper and lower layers thereof are within the scope of this invention, the surface of the magnetic layer has large undulations havng the wavelength of 20 to 30 μm, thereby lowering both of the friction therebetween and the sliding noise.

If the magnetic layer is excessively thickened, the effects of the layer containing carbon black is worth nothing. In the invention, therefore, the magnetic layer is to usually have a thickness of not thicker than 4.0 μm, preferably from 0.3 to 2.5 μm and more preferably from 0.3 to 1.5 μm.

If the thickness of the magnetic layer exceeds 4.0 μm, the specific surface resistance of the magnetic layer is increased, so that the drop-out of the magnetic recording medium is increased. On the other hand, if the thickness of the magnetic layer is thinner than 0.3 μm, the under-coated carbon black-containing layer affects the magnetic layer seriously to roughen the surface of the magnetic layer, so that the lumi S/N and chroma S/N of the magnetic recording medium are lowered.

In the case that the magnetic recording medium is used in a tape form, the magnetic layer coated on a support in the above-described method is treated, if required, to orient ferromagnetic metal oxide powder of the magnetic layer and then the formed magnetic layer is dried.

In this instance, the magnetic flux density of the oriented magnetic field is of the order of 20 to 5,000 gauss of A.C. or D.C., the drying temperature is of the order of 30 to 200° C., and the drying time is of the order of 0.1 to 10 minutes. If required, the magnetic recording media of the invention are subjected to a surface smoothing treatment or they are cut into a desired shape, when they are prepared.

On the other hand, in the case that the magnetic recording medium of the invention is used in a form of magnetic recording disk, the coated magnetic layer is subjected to a deorienting treatment.

Among magnetic recording media, a magnetic recording disk makes a magnetic recording in the circumferential direction. The disk is unable to display any excellent electromagnetic conversion characteristics, if needle-shaped magnetic-powder is oriented toward the longitudinal direction of a base, as is done with a magnetic tape.

In the conventional magnetic disks, therefore, a recording and/or preproduction have smoothly be done in the circumferential direction in such a manner as follows. A magnetic paint has been coated over a base film and subjected to a deorienting magnetic field so as to deorient needle-shaped magnetic powder contained in a magnetic layer, and the layer has then been dried.

As the methods for making a deorienting process such as mentioned above, the following deorienting methods have been known.

(i) A deorienting method wherein the first orienting magnetic field is applied to magnetic particles so as to orient the particles toward the coating direction of a magnetic paint, then the particles are deoriented by applying the second magnetic field which has the direction reverse to that of the first orienting magnetic field and is weaker than the first orienting magnetic field. For the details, refer to Japanese Patent Publication Open to Public Inspection (herein after abbreviated to Japanese Patent O.P.I. Publication) No. 53-104206/1978;

(ii) Another deorienting method wherein the first orienting magnetic field is applied to magnetic particles so as to orient the particles toward the coating direction of a magnetic paint, then the particles are deoriented by applying a plurality of orienting magnetic fields each relatively weaker than the first orienting magnetic field. Refer to Japanese Patent O.P.I. Publication No. 54-149607/1979;

(iii) A further deorienting method wherein 5 or more pieces of magnets are arranged to a magnetic paint-coated surface or to the other surface opposite thereto so as to have the alternately different polarities and to gradually attenuate the magnetic force to the support-transporting direction, and, further, to make substantially successive the lines of magnetic force adjoining each other. For the details, refer to Japanese Patent O.P.I. Publication No. 59-124039/1984;

(iv) Yet another deorienting method using attenuating magnetic fields having the directions each changing alternately to preferably +45° or −45°, and reversing to each other. Refer to Japanese Patent O.P.I. Publication No. 54-159204/1979;

(v) A still another deorienting method wherein bar magnets are partitively arranged widthwise with an angle of 5 to 45° to the coating direction of a magnetic paint. Refer to Japanese Patent O.P.I. Publication No. 59-42644/1984;

(vi) A still further deorienting method wherein an orienting roller is so used as to generate megnetic fields. Refer to Japanese Patent O.P.I. Publication No. 57-189344/-1982;

(vii) Another deorienting method wherein a plurality of magnets are arranged to position the N- and S-polars thereof alternately so that magnetic field may be generated at a right angle to the direction of transporting a coating web. Refer to Japanese Patent O.P.I. Publication No. 59-148140/-1984; and (viii) An additional deorienting method wherein magnets are arranged to position the S-polars thereof alternately so that magnetic fields may be generated at a right angle to the direction of coating a magnetic paint. Refer to Japanese Patent O.P.I. Publication No. 59-148140/1984.

The above-described conventional deorienting methods have the following problems.

In Methods (i) through (iii), the magnetic field should have a certain pattern. Therefore, the measurements and setting of the magnetic field are hardly reproducible, so that the operability and producibility may not be stabilized.

Methods (iv; and (v) have a limited versatility of using variously different magnetic particles. Particularly in method (iv), the orientations are varied alternately and a deoriented assembly may hardly be produced so as to reverse the orientation with attenuation.

In Methods (vi), (vii) and (viii), special rollers and a plurality of magnets or solenoids should be used. It is, therefore, difficult to apply these methods to a practical equipment.

Therefore, any one of the above-described methods has been seriously low in operation efficiency, because the optimum points for deorientation are varied according to the kinds of magnetic particles, and the viscosities and coating speeds of magnetic particles. For example, when preparing a plurality of products, the preparaton conditions should be changed separately for each kind of products and magnets should also be replaced, respectively. In addition to the above, even if the paint viscosity is scattered a little in the process of preparing a product, the orientation degrees of the product is often affected. Therefore, the extremely strict viscosity control should be required.

In contrast to the above, after a magnetic layer is formed by coating a magnetic paint on a support and under the conditions that a portion where magnetic fields are combined is provided so as to satisfy the following Formula I in at least one of the longitudinal and lateral directions of the support and also to satisfy the following Formulas II, III and IV in at least one of the longitudinal and lateral directions of the support, when applying the method for preparing a magnetic recording medium, wherein magnetic particles inside the above-mentioned magnetic layer are substantially deoriented by applying a plurality of magnetic fields one after another to the magnetic layer, various kinds of products can be manufactured with the magnets having the same specifications, and the deorientation can be stably performed without being affected by the variation factors in manufacture such as the viscosities of paints. This method is therefore most preferable.

$$0.65 \cdot Hn \leq Hn + 1 \leq 0.85 \cdot Hn \qquad \text{I}$$

$$H\text{max} \geq 300 \sqrt{V \cdot \eta / Hc} \qquad \text{II}$$

$$H'\text{max} \geq H\text{max}/2 \qquad \text{III}$$

$$H'\text{min} \leq 15 \sqrt{V \cdot \eta / Hc} \qquad \text{IV}$$

wherein

Hn: An Oe value of the peak intensity of a magnetic field applied to the magnetic layer immediately after the direction of the magnetic field is changed (n−1) times;

Hn+1: An Oe value of the peak intensity of a magnetic field applied to the magnetic layer, which is obtained immediately after the direction of the magnetic field is changed n times;

Hmax: A maximum Oe value of a peak intensity of a plurality of the magnetic fields;

V: A speed of coating the magnetic paint on the support, in terms of m/sec.;

η: A viscosity of the magnetic paint, in terms of cp;

Hc: A coercive force of the magnetic particles, in terms of Oe;

H'max: A maximum value of a peak intensity of a magnetic field in the portion where the magnetic fields are combined, in terms of Oe; and H'min: A minimum value of a peak intensity of a magnetic netic field included in the portion where the magnetic fields are combined, in terms of Oe.

In this method, the expression, 'Formulas I, II, III and IV are satisfied in the longitudinal direction of the support.', comes under the case where the components of the magnetic field intensity in the longitudinal direction of the support can satisfy 'Formulas I, II, III and IV. For example, if bar magnets are arranged one after another at a right angle to the longitudinal direction of the support, the magnetic fields can be generated in the longitudinal direction of the support.

The expression; 'Formulas I and so forth are satisfied in the lateral direction of the support.', comes under the case where the components of the magnetic field intensity in the lateral direction of the support can satisfy 'Formulas I and so forth. For example, if bar magnets are arranged one after another in parallel to the longitudinal direction of the support, the magnetic fields can be generated in the lateral direction of the support.

Further, such bar magnets may be arranged on the angle to the longitudinal direction of the support. In this case, the magnetic field components can be generated at the same time in both longitudinal and lateral directions of the support.

These components of each magnetic field intensity are fixed by a distance from the support and an angle formed between a magnet and the support.

Figure 2:
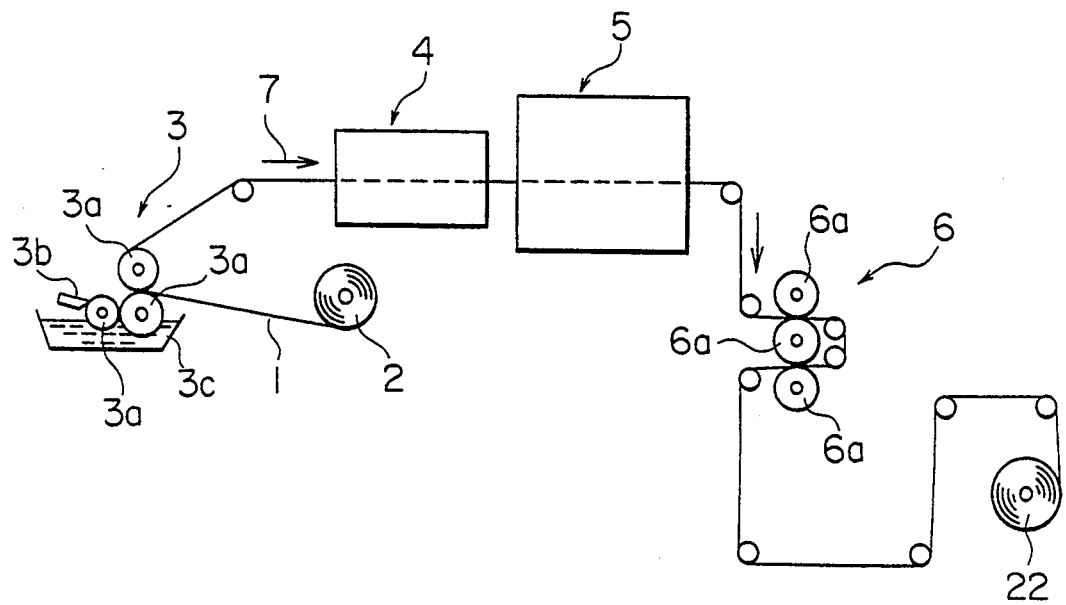

Referring to FIGS. 1 and 2, the outlines of the preparation process of the magnetic recording medium by this method and the preparation apparatus thereof will be explained.

FIG. 1 and 2 show the examples of the preparation apparatuses respectively having a simultaneous double-layer coating means and a single-layer coating means.

Support 1 wound round supply roll 2 is transported to magnetic paint coating means 3 to apply a coated layer containing magnetic particles. Successively, the layer-coated support passes through deorienting magnetic field 4 which makes the magnetic particles be oriented and passes successively through drying means 5 to dry the coated layer, so that a magnetic layer is formed on the support. Next, the support with the magnetic layer is taken up around take-up roll 22, upon introduction of it into calender section 6 comprising calender rolls 6a to calender it, if required. Thereafter, the rolled support with the magnetic layer is subjected to a successive punching process to make it into disk-form. Before or after the puching process, it may be subjected to a polishing process. In FIG. 1, $T_1$ and $T_2$ are the tanks of the paints for the lower layer and for the upper layer, respectively. In FIG. 2, 3a each are coating rolls, 3b is a blade for scraping off extra paints, 3c is magnetic paint and arrow 7 indicates the longitudinal direction of coating the magnetic paint, that is, the direction of transporting support 1.

Also, in FIGS. 1 and 2, after support 1 is coated thereon with a layer containing magnetic particles, i.e., magnetic paint, by means of magnetic paint coating means 3 and during the coated layer remaining unset and undried is passing through deorienting magnetic field 4, the magnetic particles having been mechanically oriented to the direction 7 of transporting support 1 by means of coating mean 3 is substantially deoriented.

Figure 3:
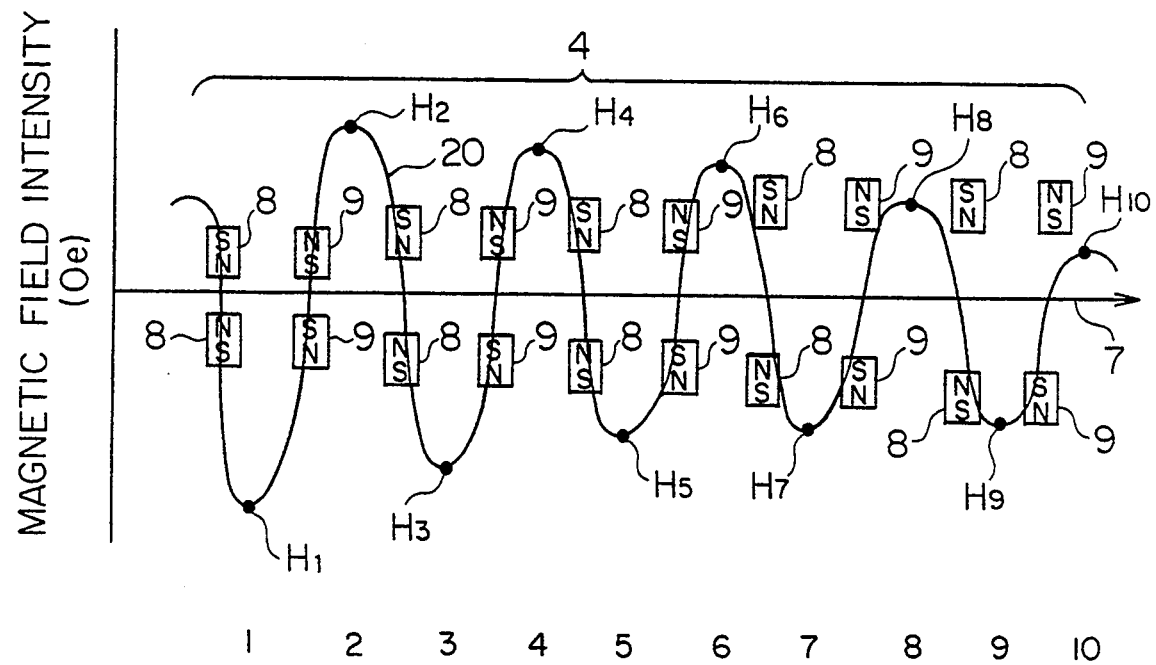

As shown in FIG. 3, for example, permanent magnets 8, 9 are arranged to deorienting magnetic field 4, at prescribed intervals along the direction 7 of transporting support 1 so as to make the polarities be reversed alternately, thereby forming synthesized magnetic field 20 with permanent magnets 8, 9. In FIG. 3, ①) to are the numbers of magnetic fields, and and so forth are omitted therefrom.

Accordingly, it is discovered that the requirements of the foregoing Formulas I through IV are to be satisfied as the important factors in the deorienting method having the widest aptitude range.

To be more concrete, this deorienting method is a method in which magnetic particles are applied to gradually attenuating megnetic fields each alternately having different directions, in serial. In this method, how to attenuate the magnetic fields is one of the most important factors. Taking these factors into consideration, the present inventor could obtain the overachieved good results when the following requirements were satisfied.

In the magnetic field adjacent to a relatively weak magnetic field that is a weak magnetic field intensity area having a peak of not higher than one half of the peak of the highest intensity magnetic field, the intensity peak of the adjacent magnetic field is made limitative by the following Formula I:

$$0.65.Hn \leqq Hn+1 \leqq 0.85.Hn \qquad \text{I}$$

The above-described intensity peak of a magnetic field means a value indicated by the black dots $H_1$ to $H_{10}$ in FIG. 3.

In the portion where the magnetic fields satisfying Formula I are combined, three or more magnetic fields, for example, may be contained.

In addition, the essence of the method include not only the above-described point but also the point that the upper and lower limits are specifically provided in the areas where the magnetic fields satisfying the above-given Formula I are combined.

In other words, first, as shown by the following Formula III, about the peaks of the magnetic fields belonging to the above-mentioned combined portion, the maximum value H'max was limited. Therefore, a deorientation can be made continuously and effectively from the stage where the magnetic field intensity is satisfactorily great on. Consequently, the satisfaction of Formula I can be assured even in a relatively weak magnetic field having a peak of not higher than one half of that of the highest intensity magnetic field. If there is no requirement for satisfying the following Formula III, the foregoing Formula I cannot be satisfied in the relatively weak magnetic field, so that the effects of the invention cannot be displayed.

Second, it is essential that the lower limit of the combined portion satisfying Formula I was so specified as to satisfy the following Formula IV. When the foregoing Formula I can be satisfied even in an area where the magnetic field intensity is substantially weak as described above, every deorienting process can satisfactorily be performed even in the cases of varying the viscosity conditions of coating solutions, or changing the kinds of magnetic particles.

$$H'min 15 \sqrt{V.\eta/Hc} \qquad \text{IV}$$

Third, the following Formula II should be satisfied, because s satisfactory deorientation cannot be achieved even if only the above-described limitations are placed one after another. When satisfying Formula II, magnetic particles inside a magnetically layer coated can forcibly be moved and, further, the particles can satisfactorily be moved by the magnetic field having Hmax and successively by the magnetic field having H'max.

$$Hmax \geqq 300 \sqrt{V.\eta/Hc} \qquad \text{II}$$

With such a deorienting means as shown in FIG. 3, the preparation method may be carried out by using a plurality of magnets each having the same magnetic intensity so that the magnetic intensity distribution on a support may be adjusted by arranging the magnets to the positions a certain distance apart from the support.

In deorienting magnetic field 4 shown in FIG. 1 or 2, such a deorienting means as shown in FIG. 3 may laso be used.

Figure 4:
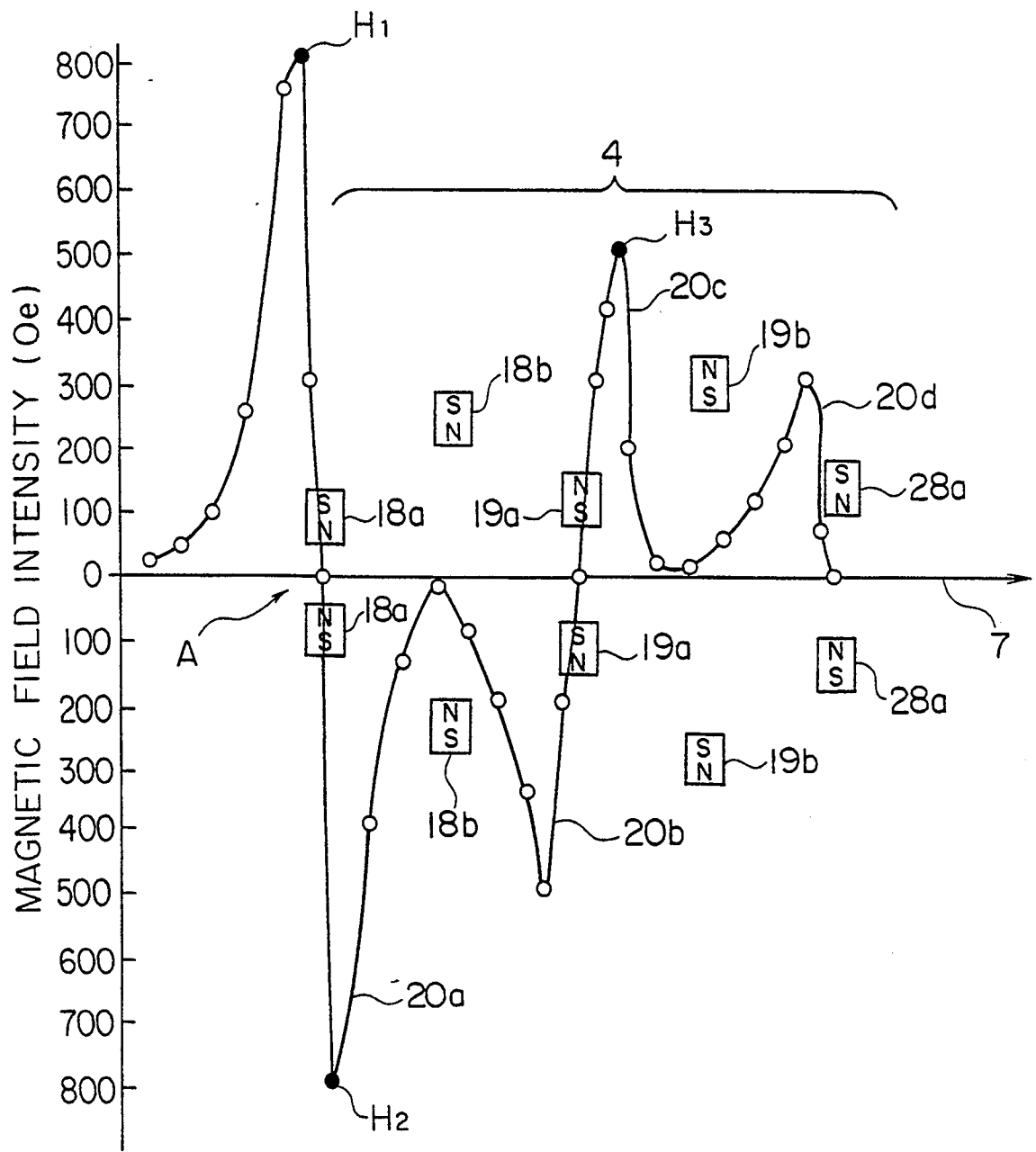

In this example, bar magnets 18a, 18b, 19a, 19b, 28a, ......... are arranged one after another to the both sides of a support along support-transporting direction 7, so that magnetic fields 20a and 20b oriented to the negative direction, and magnetic fields 20c and 20d oriented to the positive direction, each may be generated by the combination of these magnets, that is, the combination of keeping each magnets a certain distances apart from the support comprising a magnetically coated layer and of keeping the distances between the magnet constant. The distance between each magnet may be 40 mm, for example. In FIG. 4, A shows the entrance of a mgnetic field.

Each magnet arranged in this way generates a magnetic flux. In the magnetic flux, when the component of the flux in support-transporting direction 7 is negative (−) and that in the reverse direction is positive (+), the magnetic field intensity is varied to be $20a > 20b$ and $20c > 20d$ according to the distances from the support, in the synthesized magnetic field acting on the support; provided, there may be some instances where 20b may be equal to or the same with 20c, $20b \leq 20c$ in terms of the absolute value. In other words, immediately after two negatively oriented magnetic fields 20a and 20b act under the condition of $20a > 20b$, two positively oriented magnetic fields 20c and 20d act under the conditions of $20b \geq 20c$ and $20c > 20d$, and the same actions may be repeated it required. Therefore, especially when accelerating a line speed, the deoriented magnetic field will sufficiently act on the magnetic particles within a magnetically coated layer. In this case, however, from the viewpoint of generating such effective magnetic fields as described above, it is essential that the distance of each magnet apart from the support should be determined as shown in the drawing on condition that the magnetic intensity of the magnets may be the same and the distances or pitches between the magnets should be suitably determined. If such magnets is not properly arranged, any desirable distribution of the magnetic field intensities may not be obtained. In other words, for example, if each magnet is arranged too far, the magnetic intensity distribution shown in FIG. 4 cannot be obtained in their synthesized magnetic field. If each magnet is arranged too close, the variations of the magnetic field intensities shown in FIG. 4 can hardly be made.

In this case where a magnetic field generated immediately after the (n−1)th variation in the direction of the magnetic field, the magnetic field will be 20a when n is 2, and 20c when n is 3. The peak value of the magnetic field immediately after the (n−1)th variation of the magnetic field direction is indicated by black dots.

The above-described method for deorienting magnetic powder can be aplied not only to the magnetic recording media comprising the Fe-Al type ferromagnetic metal powder of the invention or the tabular-shaped magnetic powder thereof but also to the magnetic recording media comprising various types of ferromagnetic powders including, for example, iron oxide magnetic powders such as those of $\gamma$-$Fe_2O_3$, Co-containing $\gamma$-$Fe_2O_3$, and Co-containing $Fe_2O$; metal magnetic powders comprising Fe, Ni or Co; or magnetic metal powders principally comprising Fe, Ni or Co, such as Fe-Ni-Co alloy, Fe-Ni alloy, Fe-Mn-Zn alloy, Fe-Ni-Zn alloy, Fe-Co-Ni-Cr alloy, Fe-Co-Ni-P alloy or Co-Ni alloy. It is needless to say that the effects thereof are superior to those of the conventional type deorienting methods.

Particularly when a deorientation is carried out by doublelayer-coating two kinds of megnetic layers in a wet-on-wet system, it is required to make both upper and lower magnetic members simultaneously be in a certain deoriented state. However, the optimum deorientation conditions can not always be coincident with each other, so that it is very difficult to set them in practical deorientation conditions.

According to the above-described method, it is readily be possible to simultaneously deorient a plurality of multi-layered magnetic layers in a wet-on-wet system.

EXAMPLES

Now, the invention will be detailed with reference to the following examples. It is, however, to be understood that the invention shall not be limited thereto.

EXAMPLE 1

Preparation of the Paint for the Lower Layer

The paint was prepared in the following manner.

Twenty (20) weight parts of carbon black having an average particle size of 20 m$\mu$ and oil absorption of 115 ml/100 g, and 15 weight parts of potassium sulfonate containing-polyurethane resin, under the trade name of UR8700 manufactured by Toyo Boseki Co., together with a small amount of solvent were kneaded by a kneader; the kneaded matter was duluted with a solvent to make its viscosity be 10 to 50 poise.; each of the components of the diluted matter was dispersed by a sand-mill; the dispersed matter was added with 5 weight parts of polyisocyanate under the trade name of Colonate L manufactured by Japan Polyurethane Industrial Co.; and thus the paint was prepared.

Preparation of the Paint for a Magnetic Layer as the Upper Layer

The paint was prepared in the following manner.

The magnetic paints having the compositions shown in the following Tables 1 and 9 and a small amount of solvent were kneaded by a kneader; the kneaded matter was diluted with a mixed solvent comprising cyclohexanone, methylethyl ketone and toluene to make its viscosity be 50 poise; each of the components of the diluted matter was dispersed by a sandmill; the dispersed matter was further diluted with the above mixed solvent to make its viscosity be 10 poise; the diluted matter was added with 5 weight parts of polyisocyanate; and thus the paint was prepared.

TABLE I

| <Paint I for a magnetic layer as the upper layer> | |
|---|---|
| Component | Proportion (by weight) |
| Ferromagnetic Fe—Al powder, Hc = 1500 Oe, BET = 50 m$^2$/g, ave. particle size = 0.20 $\mu$m | 100 |
| Vinyl chloride resin containing potassium sulfonate, Trade name = MR110, manufactured by Japan Zeon Co. | 10 |
| Polyurethane resin containing sodium sulfonate, Trade name = UR8700 manufactured by Toyo Boseki Co. | 5 |

TABLE I-continued

<Paint I for a magnetic layer as the upper layer>

| Component | Proportion (by weight) |
|---|---|
| Aluminium oxide, an ave. particle size = 0.2 μm | |
| Myristic acid | 1 |
| Stearic acid | 1 |
| Butyl stearate | 0.5 |

TABLE 2

<Paint II for the magnetic layer as the upper layer>

| Component | Proportion (by weight) |
|---|---|
| Co—Ti substituted hexagonal barium ferrite, Hc = 600 Oe, BET = m²/g, ave. particle size = 0.09 μm | 100 |
| Vinyl chloride resin containing potassium sulfonate, Trade name = MR110 manufactured by Japan Zeon Co. | 10 |
| Polyurethane resin containing sodium sulfonate, Trade name = UR8700 manufactured by Toyo Boseki Co. | 5 |
| Aluminium oxide, ave. particle size = 0.2 μm | 5 |
| Myristic acid | 1 |
| Stearic acid | 1 |
| Butyl stearate | 0.5 |

Coating

Both of the upper layer and the lower layer were double-layered simultaneously on a support, in the wet-on-wet coating system by means of an extrusion type coater.

In the coating process, the amount of the coating solution extruded was so adjusted as to make the thickness of the lower layer be about 1 μm and that of the upper layer be 0.3 to 4 μm, by means of a pump.

After the upper and lower layers were double-coated on the support in the above-described manner, magnetic field orientation and drying treatments were applied, so that a magnetic recording medium was prepared.

Inventive Samples 1 and 2 were prepared in the above described manner each using magnetic paints I and II, respectively. Further Comparative Samples 1 to 5 having the composition shown in Table 3 were prepared in the manner similar to the inventive samples.

TABLE 3

<Requirements for preparing the magnetic recording medium>

| Example | MagneTIC material of the upper layer | Presence of the lower layer | Thickness of the upper layer | **Coating system |
|---|---|---|---|---|
| Invention 1 | (I) | Yes | 2.5 | W |
| Invention 2 | (II) | Yes | 2.5 | W |
| Comparative 1 | *(I) | No | 2.5 | — |
| Comparative 2 | *(II) | No | 2.5 | — |
| Comparative 3 | (I) | Yes | 4.5 | W |
| Comparative 4 | (I) | Yes | 2.5 | D |
| Comparative 5 | ***Co-γ-iron oxide | Yes | 2.5 | W |

*The upper layer contained 5 weight parts of carbon black having an average particle size of 20 mμ.
**W = Coating was made in a wet-on-wet coating system, D = Coating was made in a wet-on-dry coating system.
***Co-γ-iron oxide powder having a longitudinal axis length of 0.25 μm and Hc of 700 Oe was used in place of the Fe—Al powder of paint I.

Characteristics of these examples were determined by the following methods.

RF Output

The reproduction output of a 100% white signal was obtained in comparison to that obtained from the tape of Comparative Example 1 which was set as the control.

Lumi S/N

Lumi S/N was read by inputting a 100% white signal on the control level and then a reproduction video signal into a magnetic recording medium by a noise-meter 925D manufactured by Shiba Soku Co., to thereby read the lumi S/N from the absolute noise value.

Chroma Output

Using 500 kHz and an RF signal, the output of a reproduction was obtained.

Chroma S/N

Using the noise-meter manufactured by Shiba Soku Co. and in comparison with Comparative Example 1, the S/N differences of chroma signals among the samples were obtained.

Specific Surface Resistance

After each of the slitted tape was sandwiched between two ½ inch-wide electrodes and a load was then applied to both ends, the electric resistance was measured when a 500 V was applied thereto.

Drop-Out

A 100% white signal was inputted to a certain section (in length of 10 to 30 m) of a magnetic recording medium and then reproduced. In this instance, 10 μs drop-outs were measured on a −14 dB level by means of a counter, Model VH01BZ manufactured by Shiba Soku co. for every one minute. An average value was obtained from the results of the measurements of the whole length of the sention measured, so that the average value obtained was determined as the drop-out value.

Sliding Noise (i) A play back is carried out without running a tape, and the resulting system noise is measured with a spectrum analyzer; (ii) a sample is played back ten times for every one minute, and each sliding noise is measured with a spectrum analyzer; and (iii) in the range of around 8 MHz, 10 path noise value is measured in comparison with the sytem noise as the standard (0 dB).

Table 4 shows the characteristics of the samples.

TABLE 4

| Characteristics | <Characteristics of the magnetic recording medium> | | | | | | |
|---|---|---|---|---|---|---|---|
| | Example | | | | | | |
| | Invention | | For Comparison | | | | |
| | 1 | 2 | 1 | 2 | 3 | 4 | 5 |
| RF output, dB | +1.3 | +1.5 | 0 | −0.5 | +1.0 | −0.1 | −0.5 |
| Lumi S/N, dB | +1.9 | +2.0 | 0 | −0.2 | +1.3 | −0.1 | −0.6 |
| Chroma output, dB | +2.5 | +2.1 | 0 | −0.8 | +2.0 | −0.9 | −0.1 |
| Chroma S/N, dB | +3.0 | +2.0 | 0 | −0.9 | +2.5 | −1.3 | −1.0 |
| Specific surface resistance, Ohm/cm | $4 \times 10^8$ | $4 \times 10^8$ | $5 \times 10^8$ | $6 \times 10^8$ | $9 \times 10^9$ | $5 \times 10^8$ | $5 \times 10^8$ |
| Drop-out, −14 dB to 10 μs, in number | 0 | 1 | 5 | 6 | 16 | 3 | 5 |
| Sliding noise dB | +1.5 | +1.6 | +6.2 | +6.3 | +5.2 | +3.9 | +4.1 |

In the magnetic recoding media of the invention, namely, Inventive samples 1 and 2 of the invention, it is obvious from Table 4 that the density of magnetic materials into the magnetic layers thereof was enhanced more than in the magnetic recording media of Comparative Samples 1 and 2, because of the presence of the lower layers containing carbon black, so that their electromagnetic transfer characteristics and particularly their chroma outputs could be improved.

Also, in the magnetic recording media of the invention, the drop-outs thereof were remarkably reduced as compared to the magnetic recording media of Comparative Sample 3 having the upper layer thickness of 4.5 μm, because their upper layer thickness was properly adjusted to be 2.5 μm.

Further in the magnetic recording media of the invention, their surface properties were excellent as compared to those of the magnetic recording medium of Comparative Example 4 prepared in the wet-on-dry coating system. Therefore, their chroma S/N and sliding noise were also excellent.

Still further in the magnetic recording media of the invention, their electromagnetic transfer characteristics were excellent as compared to the magnetic recording medium of Comparative Sample 5 containing ordinary Co-γ-iron oxide as the magnetic material thereof.

EXAMPLE 2

Preparation of a Paint for a Lower Layer

This paint was prepared in the following manner.

Twenty parts by weight of carbon black having an average particle size of 20 mμ and an oil absorption of 115 ml/100 g and 15 parts by weight of potassium sulfonate-containing polyurethane resin under the trade name of UR8700 manufactured by Toyo Bohseki Co., as well as a small amount of a solvent, were kneaded together by means of a kneader, and then further diluted with a solvent to set the viscosity to be 50 poise. After that, each of the components was dispersed, and 5 parts by weight of polyisocyanate under the trade name of Colonate L manufactured by Japan Polyurethane Industrial Co. and a solvent were added to set the viscosity to be about 20 poise, so that the paint for a lower layer was prepared.

Preparation of a Paint for an Upper Magnetic Layer

This paint was prepared in the following manner.

The magnetic paints having the compositions shown in Tables-4A and 5 as well as a small amount of solvent were kneaded by means of a kneader and further diluted with a mixed solvent of cyclohexane, methylethyl ketone and toluene to set the viscosity to be 50 poise.

After that, each of the components was dispersed by means of a sand-mill. The dispersion was diluted with the above-mentioned mixed solvent to set the later-mentioned viscosity and 5 parts by weight of polyisocyanate was then added, so that the paint for magnetic layer was prepared.

TABLE 4A

| <Paint III for the upper magnetic layer> | |
|---|---|
| Comonent<br>Viscosity: 14.6 poise | Proportion<br>(by weight) |
| Fe—Al ferromagnetic metal powder (Hc = 1300 Oe) | 100 |
| Potassium sulfonate-containing vinyl chloride resin, MR110 manufactured by Japan Zeon Co. | 10 |
| Sodium sulfonate-containing polyurethane resin, UR8700 manufactured by Toyo Bohseki Co. | 5 |
| Aluminium oxide, average particle size: 0.2 μm | 5 |
| Myristic acid | 3 |
| Butyl stearate | 6 |

TABLE 5

| <Paint IV for the upper magnetic layer> | |
|---|---|
| Comonent<br>Viscosity: 20.8 poise | Proportion<br>(by weight) |
| Co.Ti substituted type hexagonal barium ferrite (Hc = 950 Oe) | 100 |
| Potassium sulfonate-containing vinyl chloride resin, MR110 manufactured by Japan Zeon Co. | 10 |
| Sodium sulfonate-containing polyurethane resin, UR8700 manufactured by Toyo Bohseki Co. | 5 |
| Aluminium oxide, average particle size: 0.2 μm | 5 |
| Myristic acid | 3 |
| Butyl stearate | 6 |

TABLE 6

| <Preparation conditions for a magnetic recording medium> | | | | |
|---|---|---|---|---|
| Example | Magnetic material of upper layer | Presence of lower layer | Thickness of upper layer | **Coating system |
| Inv. 3 | (III) | Yes | 2.5 | W |
| Inv. 4 | (IV) | Yes | 2.5 | W |
| Comp. 6 | *(III) | No | 2.5 | — |
| Comp. 7 | *(IV) | No | 2.5 | — |
| Comp. 8 | (III) | Yes | 4.5 | W |
| Comp. 9 | (III) | Yes | 2.5 | D |
| Comp. 10 | ***Co-γ-iron oxide | Yes | 2.5 | W |

*The upper layer contained 5 parts by weight of carbon black having an average particle size of 20 mμ.
**W = Coated in Wet-on-wet coating system. D = Coated in Wet-on-dry coating system.
***The upper layer was coated with a paint in which Co-γ-iron oxide powder having a length of longitudinal axis = 0.25 μm and Hc = 700 Oe was substituted by the Fe—Al type ferromagnetic metal powder shown in Table 4.

By means of an extrusion type coater such as that shown in FIG. 1, the paint for the upper layer and the paint for the lower layer were simultaneously multicoated at a coating speed of 45 m/min, in the wet-on-wet coating system, over a 32μ thick-polyethylene terephthalate film.

In this coating, the amount of the coating solution extruded was so adjusted by a pump (not shown in the figue) as to make the thicknesses of the lower and upper layers be about 1 μm and 0.3 to 4 μm, respectively.

After the upper and lower layers were simultaneously multicoated over the support in the above-described manner, a deorienting, drying and calendering treatments were applied. And, the rear surface was also coated in the same way, so that a coated master bulk was prepared.

Thereafter, according to the standard of a 2.5 inch video floppy disk, a disk was punched, so that the video floppy disk was prepared to use the surface coated later as the recording surface. Thus Inventive Samples 3 and 4 each using magnetic paints III and IV were propared. On the other hand, Comparative Samples 6 through 10 each shown in Table-6 were also prepared in accordance with the approximate conditions.

The deoriented portion shown in FIG. 1-4 was constituted in the following manner.

Magnets having a sectional area of 10 mm×10 mm and a surface magnetic flux density of about 1000 Gauss were arranged face to face as shown in FIG. 3, and the distance between the magnets arranged face to face was adjusted, so that the following group of the magnets, i.e., the deoriented portion, was positioned. In this arrangement, H through represent each the magnetic intensities of magnetic fields (1) through (12), and it is indicated by + when the lines of magnetic force are in regularly parallel with each other and by − when in reversely prallel.

| Maximum magnetic field (Oe) | | | | | |
|---|---|---|---|---|---|
| $H_1$ | $H_2$ | $H_3$ | $H_4$ | $H_5$ | $H_6$ |
| −650 | +350 | −250 | +200 | −150 | +100 |
| $H_7$ | $H_8$ | $H_9$ | $H_{10}$ | $H_{11}$ | $H_{12}$ |
| −70 | +50 | −35 | +25 | −20 | +15 |

The characteristics of the samples thus obtained were measured in the following methods. The results thereof are shown in Table-7.

Specific Resistance of Surface

Two pieces of 10 mm wide-electrodes were placed 10 mm apart from each other and a subject sample was sandwiched therebetween, thereby the specific electric resistance of the sample surface was measured. (A 500V was applied to each electrode.)

Y—C/N

With a sample, the ratio of a 7 MHz signal output to a noise output at a point 1 MHz apart from the former output was measured, and the ratio was compared to that obtained from the disk of Comparative Sample 6. (No. 25 truck was used.)

Drive system used for the measurement

Still Video Recorder MVR-5500, made by Sony Corp.

Drop-Out

A 7 MHz signal was recorded and regenerated. Then the drop-out was measured by a drop-out counter made by Konica Corp. (Every truck was used.

When a disk had 3 or more drop-outs of not less than 15 μse in length and not less than −12 dB in depth, it was ranked as N.G., which was indicated by N.G. numbers per 100 disks.

RF Output

A 7 MHz sine wave signal was recorded by MVR-5500 made by Sony Corp, and the regenerated RF output was measured. (No. 5 truck was used.)

C—C/N

With a sample, the ratio of a 1.25 MHz signal output to a noise output at a point 0.75 MHz apart from the former output was measured, and the ratio was compared to that obtained from the standard disk. (No. 25 truck was used.)

Drive System Used for the Measurement

STILL VIDEO RECORDER MVR-5500, made by Sony Corp.

Chroma Output

A 1.25 MHz sine wave signal was superposed on a 7 MHz sine wave signal, and they were recorded and regenerated. Then, a 1.25 MHz output was measured through a band-pass filter. (No. 25 truck was used.)

Head Stain

A 24-hour continuous regeneration was made at 25° C. and 20%RH with random-seeking, and the clouds i.e., stains, on the head surface were observed through a microscope. The stains were ranked as follows. (A brand new head and a test equipment made by Konica Corp. were used.)

TABLE 7

| Rank | Head cloud | For fractical use |
|---|---|---|
| A | None | Acceptable |
| B | Faint | Acceptable |
| C | Moderate | Not acceptable |
| D | Thick | Not acceptable |

| Sample | Inv. 3 | Inv. 4 | Comp. 6 | Comp. 7 | Comp. 8 | Comp. 9 | Comp. 10 |
|---|---|---|---|---|---|---|---|
| RF output (dB) | +1.8 | +1.5 | 0 | −1.6 | +1.3 | +0.1 | −0.3* |
| Y—C/N (dB) | +2.1 | +1.8 | 0 | −0.4 | +1.6 | −1.2 | −0.6* |
| Chroma output (dB) | +3.0 | +2.0 | 0 | −1.0 | +2.4 | −1.1 | +0.1* |
| C—C/N (dB) | +3.2 | +2.3 | 0 | −1.2 | +2.5 | −1.4 | −0.8* |
| Surface specific resistance (Ω) | $4 \times 10^8$ | $5 \times 10^8$ | $5 \times 10^8$ | $7 \times 10^8$ | $1 \times 10^{10}$ | $6 \times 10^8$ | $5 \times 10^{8**}$ |

TABLE 7-continued

| | | | | | | | |
|---|---|---|---|---|---|---|---|
| Drop-out (NG/100 disks) | 2 | 3 | 10 | 13 | 41 | 7 | 12** |
| Head stain | A | B | D | D | D | C | C |

*The higher, the better.
**The lower, the better.

With a carbon-sublayered Fe-Al type or hexagonal Ba-ferrite type magnetic bodies are liable to stain or to cloud up a head, though they may have higher Y—C/N and chroma output. This stain is liable to produce when a disk surface is getting smoothened, and these stains may not be removed unless the head surface itself is scraped off, because their adhesion is strong. If such stains are allowed to stand, the electromagnetic conversion characteristics of a head are deteriorated. If trying to remove them, the head life is seriously shortened because the head surface itself is scraped off.

In fact, as shown in the example of the invention, such head clouds were lessened only when the constitution of the invention can be satisfied.

It may be considered that such head clouds may be lessened by the fact that, when a wet-on-wet coating system is carried out under the conditions that the raw materials and layer thicknesses of the upper and lower layers are within the scope of this invention, large undulations having the wavelengths of 20 to 30μ are produced on the surface of a magnetic layer and the undulations diminish the friction between them and a head, so that the head clouds may be lessened.

EXAMPLE 3

In such a reverse-roll coating method as shown in FIG. 2, a magnetic paint having the composition given in the following Table-1 was coated on one side of a 75 μm-thick polyethylene terephthalate film support in the later-described specific transport rate so as to make a dried thickness be 2.0 μm and, immediately after then, the magnetic paint-coated support was deoriented with the deorienting means illustrated in FIG. 3.

TABLE 8

| Magnetic powder | 35 wt. parts |
|---|---|
| Vinyl chloride-vinyl acetate copolymer, VAGH, manufactured by Union Carbide Co. | 6 wt. parts |
| Polyurethane, Estane 5701, manufactured by Goodrich Rubber Co. | 4 wt. parts |
| Colonate L | 3 wt. parts |
| Myristic acid | 1 wt. part |
| Butyl stearate | 2 wt. parts |
| Lecithin | 1 wt. part |
| Carbon black | 5 wt. parts |
| Alumina | 3 wt. parts |
| Methylethyl ketone | 50 wt. parts |
| Cyclohexanone | 70 wt. parts |

Three paints were prepared each using the following three kinds of magnetic powders.

| Magnetic powder: Hc | |
|---|---|
| Ferromagnetic Fe—Al powder | 1430 Oe |
| Co-γ-Fe$_2$O$_3$ | 650 Oe |
| γ-Fe$_2$O$_3$ | 310 Oe |

After preparing the magnetic paints, they were diluted with the following diluting solution so as to obtain the later-described specific viscosities.

Methylethyl ketone: cyclohexanone = 42:58

Figure 5:
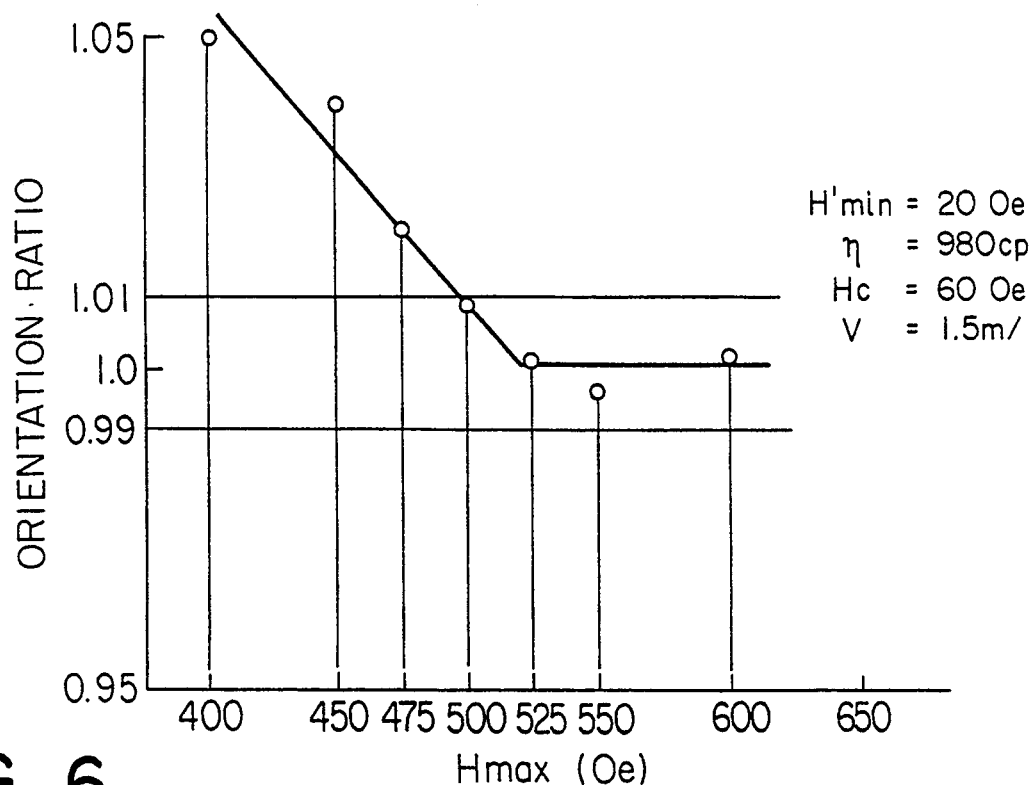

Using the above magnetic paint containing Co-γ-Fe$_2$O$_3$, keeping the conditions specified by the foregoing Formulas I and III, and under the conditions of n=980 cp, H'min=20 Oe, Hc=650 Oe and V=1.5 m/sec., the entrance magnetic field intensity peak Hmax was changed variously as shown in FIG. 5. FIG. 5 also shows the orientation ratios changed in accordance with the changes of the peak value Hmax.

In this example, the term, an orientation ratio, means a ratio of Br'/Br' in which Br' represents a residual magnetic flux density in the longitudinal direction of a magnetically coated layer and Br' represents that in the lateral direction thereof. The orientation ratios of the articles available on the market are usually of the order of 1.02 to 1.03. In this experiment, the standard marks of the orientation ratios were set within the range of 0.99 to 1.01.

In the example shown in FIG. 5, the ordination of the magnetic field intensities will be exemplified below.

| | Number of magnetic field | | | | | | | | | |
|---|---|---|---|---|---|---|---|---|---|---|
| | ① | ② | ③ | ④ | ⑤ | ⑥ | ⑦ | ⑧ | ⑨ | 10 |
| Intensities Oe of magnets on the magnetically coated layer | 500 | 330 | 220 | 160 | 110 | 80 | 55 | 40 | 30 | 20 |
| | 550 | " | " | " | " | " | " | " | " | " |
| | 600 | " | " | " | " | " | " | " | " | " |

As is obvious from FIG. 5, when magnetic intensity peak Hmax is lowered to a value of not higher than a certain value by changing the Hmax of an entrance magnetic field that is the magnetic field having the maximum intensity in this example, the orientation ratio is deteriorated to be out of the above-described range of 1.01 to 0.99. This critical value is called H° max. In the example shown in FIG. 5, its H⁰max was 500 Oe.

Figure 6:
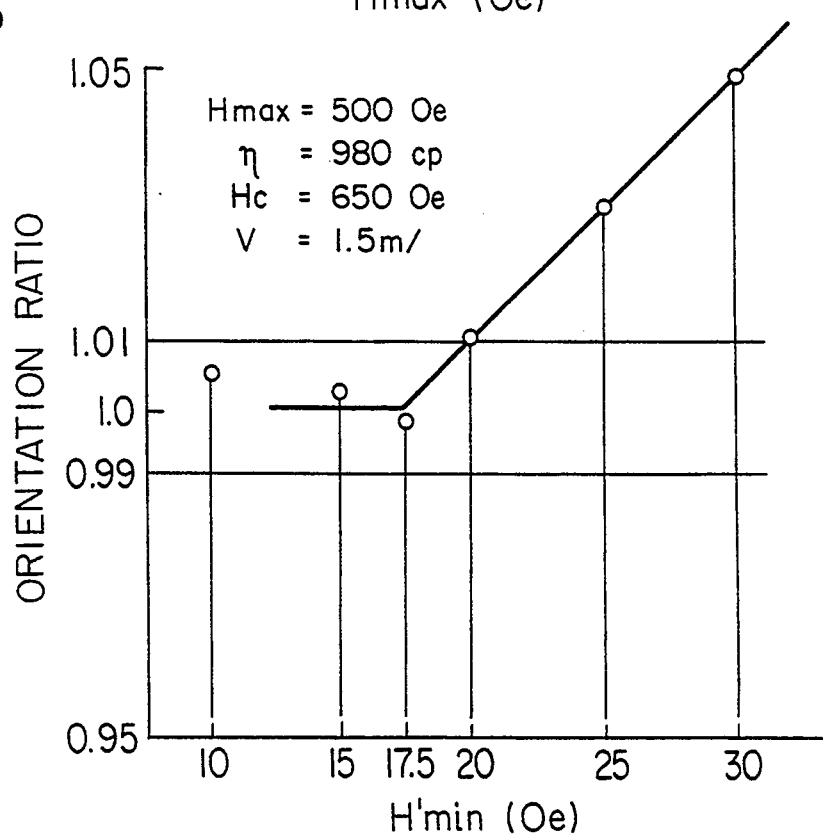

Using the foregoing magnetic paint, keeping the foregoing conditions specified by Formulas I and III, and under the conditions of n=980 cp, Hmax=500 Oe, Hc=650 Oe and V=1.5 m/sec., the exit magnetic field intensity peak H'min was changed variously as shown in FIG. 6. FIG. 6 also shows the orientation ratios changed in accordance with the changes of the peak value Hmax.

In the portion having the combination of the magnetic fields satisfying the foregoing Formula I, the termination of the minimum intensity magnetic field was served as the exit magnetic field in this experimental example. It therefore means that the exit magnetic field intensity agrees with the minimum intensity H'min of the peak intensities of the magnetic fields belonging to the portion having the combination thereof satisfying the foregoing Formula I.

Figure 7:
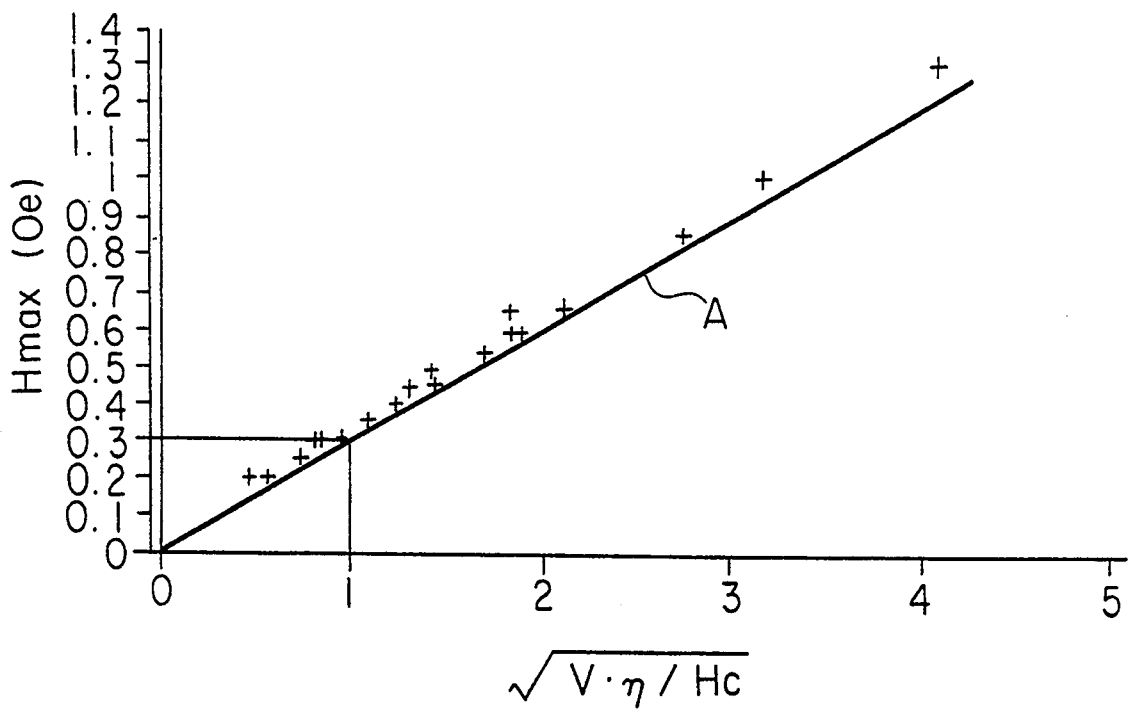
Figure 8:
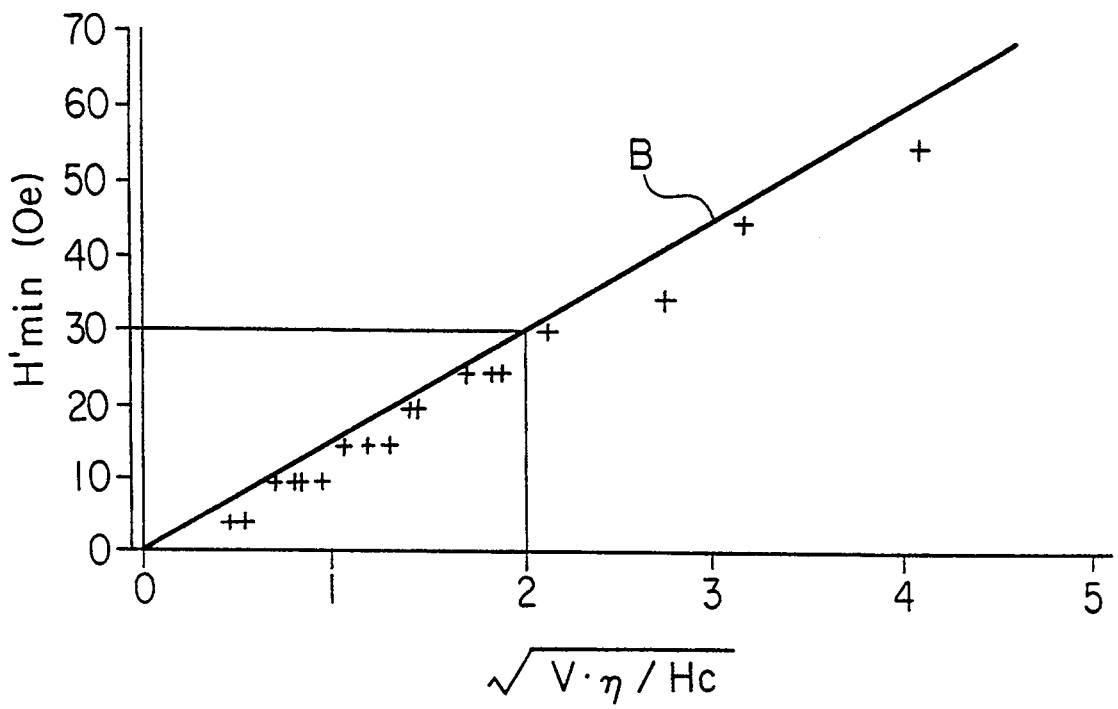

In the example shown in FIG. 6, the ordination of the the abscissa and ordinate showin in FIG. 8, respectively. To obtain the relation between the Hmax and $\sqrt{V.\eta/Hc}$ on each plot in FIG. 7, linear graph A was drawn and thereby the relation expressed by the following Formula II could be derived.

| | Number of magnetic field | | | | | | | | | | |
|---|---|---|---|---|---|---|---|---|---|---|---|
| | ① | ② | ③ | ④ | ⑤ | ⑥ | ⑦ | ⑧ | ⑨ | 10 | 11 |
| Intensities Oe of magnets on the magnetically coated layer | 500 " " | 330 " " | 220 " " | 160 " " | 110 " " | 80 " " | 55 " " | 40 " " | 30 " " | 20 20 — | 15 — — |

As is obvious from FIG. 6, when magnetic intensity peak H'min is lowered to a value of higher than a certain value by changing the an exit magnetic field peak, the orientation ratio is deteriorated to be out of the range of 1.01 to 0.99. This critical value was 20 Oe in the example shown in FIG. 6.

After treating in this way, Hc of the magnetic powder, and viscosity $\eta$ and coating rate V of the magnetic paint were changed as shown in the following Table-9. The critical Hmax and H'min values of the resulting samples were obtained in the methods shown in FIGS. 5 and 6 so that the foregoing orientation ratio of 1.01 to 0.99 may be obtained. The results thereof are shown in the following Table-9.

TABLE 9

| Value measured | | Hmax (Oe) V m/sec | | | H'min (Oe) V m/sec | | |
|---|---|---|---|---|---|---|---|
| Hc(Oe) | $\eta$(cp) | 0.5 | 1.5 | 2.5 | 0.5 | 1.5 | 2.5 |
| 1430 | 2000 | 300 | 500 | 600 | 10 | 20 | 25 |
| 1430 | 860 | 200 | 300 | 400 | 5 | 10 | 15 |
| 650 | 1920 | 400 | 650 | 850 | 15 | 30 | 40 |
| 650 | 980 | 300 | 500 | 600 | 10 | 20 | 25 |
| 650 | 300 | 150 | 300 | 350 | 5 | 10 | 15 |
| 310 | 2050 | 600 | 1000 | 1250 | 25 | 45 | 55 |
| 310 | 910 | 400 | 700 | 850 | 15 | 30 | 40 |
| 310 | 350 | 250 | 450 | 550 | 10 | 15 | 25 |

In this test, the foregoing paints each containing the ferromagnetic Fe-Al powder and $\gamma$-$Fe_2O_3$ powder were used for the conditions of 1430 Oe and 310 Oe, respectively.

From the above Table-9, a value of $\sqrt{V.\eta/Hc}$ and the value of Hmax corresponding thereto were computed and plotted on the abscissa and ordinate of plane coordinates shown on FIG. 7, respectively. And, the $\sqrt{V.\eta/Hc}$ value and the H'min value were plotted on the abscissa and ordinate showin in FIG. 8, respectively. To obtain the relation between the Hmax and $\sqrt{V.\eta/Hc}$ on each plot in FIG. 7, linear graph A was drawn and thereby the relation expressed by the following Formula II could be derived.

Graph A: Hmax = 300 $\sqrt{V.\eta/Hc}$

Each plot was found to be above Graph A. Therefore, the following expression could be derived.

$$Hmax \geq 300 \sqrt{V.\eta/Hc} \quad \text{II}$$

In the same way, when linear graph B was drawn on FIG. 8, each plot was found to be below graph B. Therefore, the following expression could be derived.

Graph B: H'min = 15 $\sqrt{V.\eta/Hc}$ $$H'min 15 \sqrt{V.\eta/Hc} \quad \text{IV}$$

EXAMPLE 4

Magnets each having a sectional area od 10 mm×10 mm and a surface magnetic flux density of about 1,000 Gauss were arranged face to face on the both sides of the aforedescribed magnetic paint-coated layer and the intervals between the magnets face to face were adjusted, thereby forming the group consisting of the magnets, in Series A, B and C, each having the following magnetic field densities (Oe) in the deoriented portion. In this arrangement, when the magnetic lines of force is in ordinarily parallel with the paint-coating direction, the direction of the magnetic lines is referred to as Ord., while it is in reversely parallel with the paint-coating direction, it is referred to as Rev.

| | $H_1$ | $H_2$ | $H_3$ | $H_4$ | $H_5$ | $H_6$ |
|---|---|---|---|---|---|---|
| Magnet series A | 650 | 350 | 250 | 200 | 150 | 100 |
| Magnet series B | 650 | 350 | 250 | 200 | 150 | 100 |
| Magnet series C | 750 | 350 | 250 | 200 | 150 | 100 |
| Magnet series D | 650 | 350 | 305 | 270 | 235 | 205 |
| (Attenuation ratio) | | (0.54) | (0.87) | (0.89) | (0.87) | (0.87) |
| Direction of magnetic lines of force | Ord. | Rev. | Ord. | Rev. | Ord. | Rev. |

| | $H_7$ | $H_8$ | $H_9$ | $H_{10}$ | $H_{11}$ | $H_{12}$ |
|---|---|---|---|---|---|---|
| Magnet series A | 70 | 50 | 35 | 25 | 20 | 15 |
| Magnet series B | 70 | 50 | 35 | 25 | 25 | 15 |
| Magnet series C | 70 | 50 | 35 | 25 | 20 | 15 |
| Magnet series D | 180 | 135 | 85 | 50 | 30 | 15 |
| (Attenuation ratio) | (0.88) | (0.75) | (0.63) | (0.63) | (0.60) | (0.50) |
| Direction of magnetic lines of force | Ord. | Rev. | Ord. | Rev. | Ord. | Rev. |

In the above tables, $H_2$ through $H_{12}$ of magnet series A satisfied the foregoing Formula I, and $H_2$ was equal to H'max, ($H_2$ = H'max). Therefore, the following Formula III could also be satisfied.

$$H'max \geq Hmax/2 \quad \text{III}$$

In magnet series B, $H_2$ through $H_{10}$ satisfied the foregoing Formula I and $H_2$ was equal to H'max, ($H_2$=H'max). The above Formula III couls also be satisfied.

In magnet series C, the foregoing Formula III could not be satisfied.

In magnet series D, the Formula I could not be satisfied in the whole, but only the combination of $H_7$ and $H_8$ could satisfy the Formula I. This combined portion could not naturally satisfy the foregoing Formulas II through IV.

Further similar to Example 3, upon variously changing coercive force Hc of magnetic powder, viscosity $\eta$ of magnetic paint and coating speed V which were to be applied to magnetic paint-coated layers, the magnetic layers were coated on supports under the respective conditions. The resulting magnetic layers coated on the supports were each deoriented by the deorienting magnetic field comprising the abovedescribed magnet series A, B, C or D. Then the orientation ratio of each resulting product was measured. The following Table-10 shows the values of Hc, n and V by magnetic series A and B and also by the Examples and comparative examples. Table-10 shows the resulted values of the orientation ratios measured of each samples. Tables-11 and 12 show the data obtained from magnet series C and D, respectively.

TABLE 10

| | | Magnet series A V (m/sec) | | | Magnet series B V (m/sec) | | |
|---|---|---|---|---|---|---|---|
| HC(Oe) | $\eta$(cp) | 0.5 | 1.5 | 2.5 | 0.5 | 1.5 | 2.5 |
| 1430 | 2000 | 1.04[1) | 1.00 | 0.99 | 1.05[1) | 1.03[1) | 1.00 |
| 1430 | 860 | 1.04[1) | 1.03[1) | 1.00 | 1.10[1) | 1.05[1) | 1.04[1) |
| 650 | 1920 | 1.00 | 1.00 | 1.03[2) | 1.03[1) | 1.00 | 1.04[2) |
| 650 | 980 | 1.04[1) | 1.01 | 1.00 | 1.05[1) | 1.03[1) | 1.00 |
| 650 | 300 | 1.07[1) | 1.04[1) | 1.00 | 1.11[1) | 1.03[1) | 1.03[1) |
| 310 | 910 | 0.99 | 1.00 | 1.04[2) | 1.04[1) | 1.00 | 1.04[2) |
| 310 | 350 | 1.02 | 1.01 | 1.00 | 1.06[1) | 1.04[1) | 1.00 |

TABLE 11

| | | Magnet series C: | | |
|---|---|---|---|---|
| | | | V (m/sec) | |
| Hc(Oe) | $\eta$(cp) | 0.5 | 1.5 | 2.5 |
| 650 | 1920 | 1.02 | 1.03 | 1.05 |
| 650 | 980 | 1.05 | 1.03 | 1.02 |
| 650 | 300 | 1.10 | 1.08 | 1.03 |

TABLE 12

| | | Magnet series D: | | |
|---|---|---|---|---|
| | | | V (m/sec) | |
| Hc(Oe) | $\eta$(cp) | 0.5 | 1.5 | 2.5 |
| 650 | 1920 | 1.03 | 1.02 | 1.07 |
| 650 | 980 | 1.08 | 1.03 | 1.03 |
| 650 | 300 | 1.10 | 1.05 | 1.02 |

In Table-10, the data marked with 1) and 2) are those obtained under the conditions not satisfying the foregoing Formula IV, that is, H'min$\leq$15 $\sqrt{V \cdot \eta/Hc}$; and not satisfying the foregoing Formula II, that is, Hmax$\geq$300 $\sqrt{V \cdot \eta/Hc}$, respectively.

Of the examples shown in Table-10, the values of $\sqrt{V \cdot \eta/Hc}$ were computed out. The values of 15 $\sqrt{V \cdot \eta/Hc}$ were plotted on the abscissa and the orientation ratios were plotted on the ordinate, so that the experimental results may be shown in FIG. 9. From the graph, the following facts may be proved.

Figure 9:
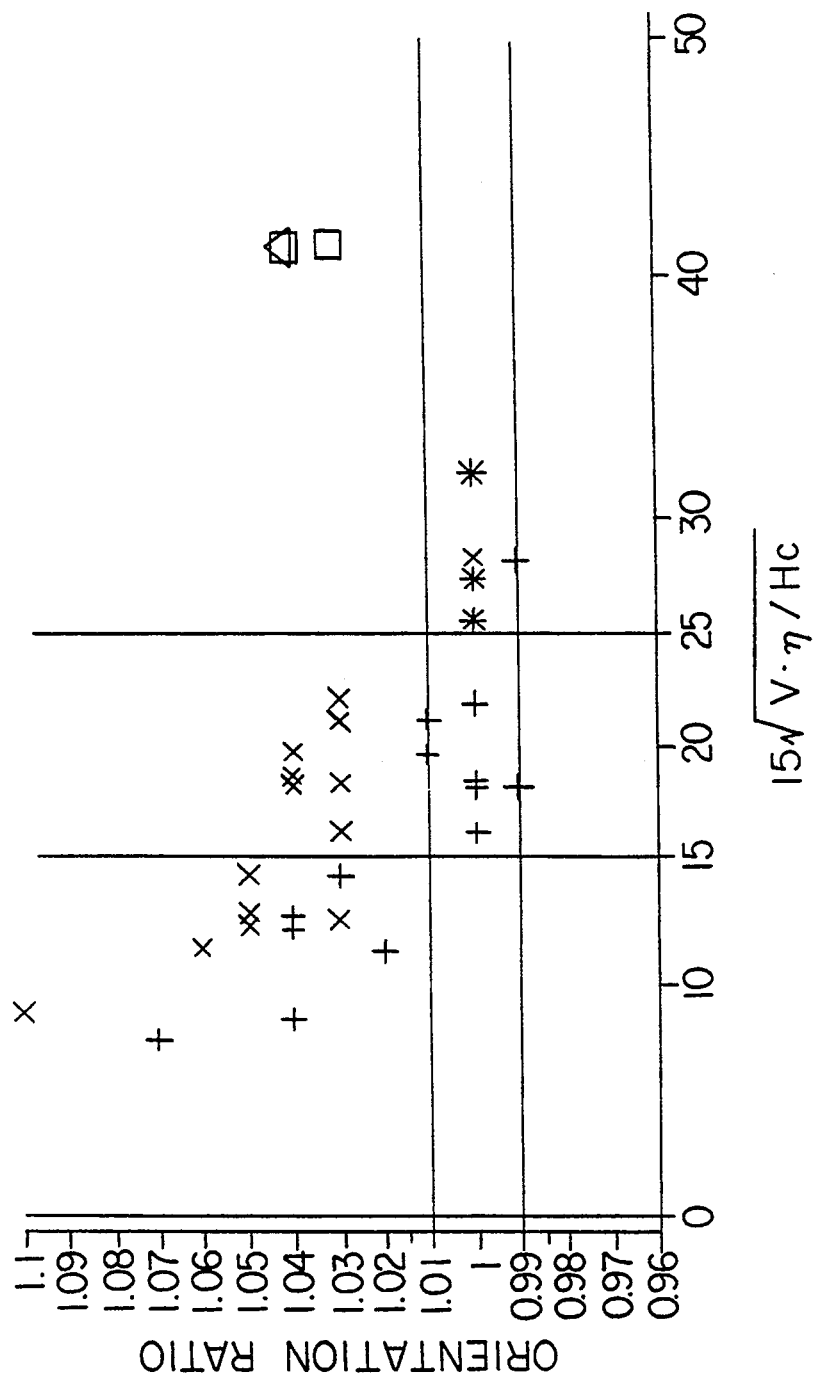

In FIG. 9, the points plotted by +, ×, *, □ and Δ each correspond to the results obtained under the following conditions:

+ Magent Series A
× Magnet Series B
* Duplication of + and ×
□ Condition of 300 $\sqrt{V \cdot \eta/Hc}$ > 650 in magnet series A
Δ Condition of 300 $\sqrt{V \cdot \eta/Hc}$ > 650 in magnet series B (1) In the case of 15 $\sqrt{V \cdot \eta/Hc}$ $\geq$ 15 in magnet series A, the orientation ratio was within the range of 0.99 to 1.01. This fact satisfied the requirements of Formula IV, however, any deorientation could not satisfactorily be performed, if the requirements of Formula II could not be satisfied and, that is to say, if the case was subject to 300 $\sqrt{V \cdot \eta/Hc}$ $\geq$ 650(Hmax) even if the case satisfied 15 $\sqrt{V \cdot \eta/Hc}$ $\geq$ 15.

(2) In the case of 15 $\sqrt{V \cdot \eta/Hc}$ $\geq$ 25 in magnet series B, the orientation ratio was within the range of 0.99 to 1.01. This fact satisfied the requirements of Formula IV, however, any deorientation could not satisfactorily be performed, if the requirements of Formula II could not be satisfied.

(3) In magnet series C which did not satisfy Formula III, any deorientation could not satisfactorily be performed.

(4) In the whole, Formula I could not be satisfied. Even in magnet series D of which the portions of $H_7$ and $H_8$ did not satisfy Formulas II through IV, any deorientation could not satisfactorily be performed.

EXAMPLE 5

Preparation of Apaint for the Lower Layer

Twenty parts by weight of carbon black having an average particle size of 20 m$\mu$ and an oil absorption of 115 ml/100 g and 15 parts by weight of potassium slfonate-containing polyurethane resin under the trade name of UR8700 manufactured by Toyo Bohseki Co. were kneaded together with a small amount of solvent by means of a kneader and were then diluted with solvent to make the viscosity be 5000 cp. After that, each of the component was dispersed by a san-mill, and 5 parts by weight of polyisocyanate under the trade name of Colonate L manufactured by Japan Polyurethane Industrial Co., and so forth, and solvent were added thereto to make the viscosity be about 2000 cp, so that a paint for the lower layer was prepared.

Preparation of a Paint for Magnetic Layers

The magnetic paints having the compositions shown in Tables 13 and 14 and a small amount of solvent were kneaded with a kneader, respectively, and each of them was diluted by a mixed solvent of cyclohexanone, methylethyl ketone and toluene so as to make the viscosity be 5000 cp. After then, each of the composition was dispersed by a sand-mill and the dilute solutions were further diluted with the above-mentioned mixed solvent to make the viscosity be 1460 cp, and 2080 cp. Then, 5 parts by weight of polyisocyanate was added, so that the paints for magnetic layers were prepared, respectively.

TABLE 13

<Paint V for magnetic layers>

| Component | Proportion (parts by weight) |
|---|---|
| Fe—Al type ferromagnetic metal powder, (Hc = 1300 Oe) | 100 |
| Potassium sulfonate-containing vinyl chloride resin, MR110 manufactured by Japan Seon Co. | 10 |
| Sodium sulfonate-containing polyurethane resin, UR8700 manufactured by Toyo Bohseki Co. | 5 |
| Aluminium oxide having an average particle size of 0.2 μm | 5 |
| Myristic acid | 3 |
| Butyl stearate | 6 |

TABLE 14

<Paint VI for magnetic layers>

| Component | Proportion (parts by weight) |
|---|---|
| Co.Ti substituted type hexagonal barium ferrite (Hc = 950 Oe) | 100 |
| Potassium sulfonate-containing vinyl chloride resin, MR110 manufactured by Japan Zeon Co. | 10 |
| Sodium sulfonate-containing polyurethane resin, UR8700 manufactured by Toyo Bohseki Co. | 5 |
| Myristic acid | 3 |
| Butyl stearate | 6 |

Using the above-described lower layer coating solutions and magnetic paints V and VI, the magnetic recording media having the following three different constitutions were prepared by simultaneously multicoating at the coating speeds of 0.5, 1.5 and 2.5 m/sec under the wet-on-wet conditions and were then deoriented by applying the deorienting magnetic fields for series A or series B similar to the case of Example 4.

Sample Series 1

The lower layer coating solution and magnetic paint V were simultaneously multicoated on a 32 μm-thick polyethylene terephthalater film by means of an extrusion-coater to make the dried layer thicknesses of the lower layer and the magnetic layer be 3.0 μm and 0.5 μm, respectively.

Sample Series 2

The lower layer coating solution and magnetic paint VI were simultaneously multicoated on the same support as in Sample series 1 by means of an extrusion-coater to make the dried layer thicknesses of the lower layer and the magnetic layer be 3.0 μm and 2.0 μm, respectively.

Sample Series 3

Magnetic paints IV and V were simultaneously multicoated on the same support as in Sample series 1 by means of an extrusion-coater to coat the former to be the upper layer and the latter to be the lower layer and to make the dried layer thicknesses of the lower layer and the upper layer be 2.0 μm and 0.5 μm, respectively.

The orientation ratios of the resulting samples were as shown in Table 13.

TABLE 13

| Sample | Hc (Oe) | η(cp) | Magnet series A V (m/sec) | | | Magnet series B V (m/sec) | | |
|---|---|---|---|---|---|---|---|---|
| | | | 0.5 | 1.5 | 2.5 | 0.5 | 1.5 | 2.5 |
| Series 1 | 1300 | 1460 | 1.03[1] | 1.00 | 1.00 | 1.05[1] | 1.04[1] | 1.01 |
| Series 2 | 950 | 2080 | 1.01 | 0.99 | 1.04[2] | 1.05[1] | 1.00 | 1.02[2] |
| Series 3 | 1300*/ 950** | 1460*/ 2080** | 1.02[1] | 1.01 | 1.03[2] | 1.05[1] | 1.02 | 1,02[2] |

In the above table, marks [1] and [2] each have the same meanings as in Table 10. Marks * and ** indicate the upper layer and the lower layer, respectively.

Figure 10:
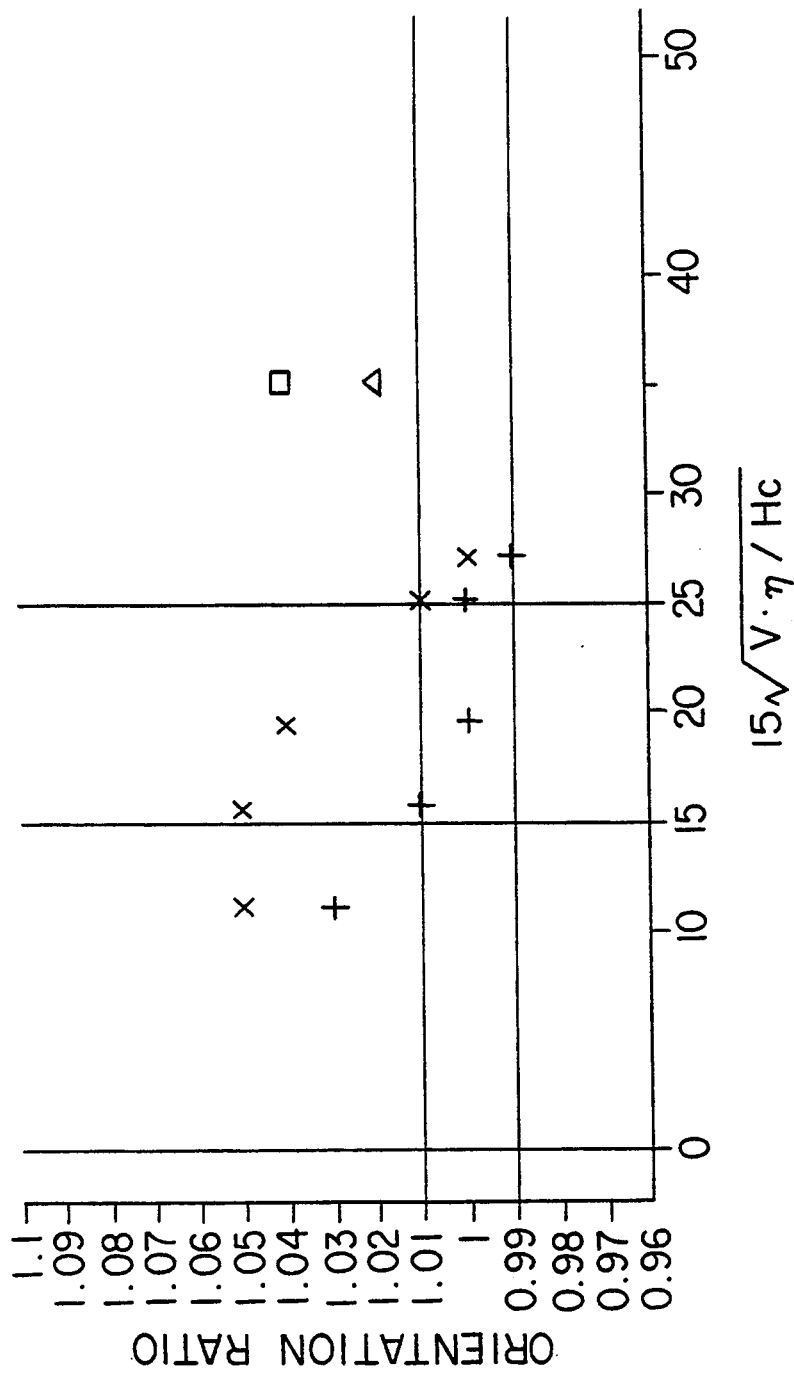

FIG. 10 shows the relation between $15.\sqrt{V}.\eta/Hc$ and the orientation ratio of Sample Series 1 to Sample Series 2.

As are obvious from Table 13 and FIG. 10, even in the case of carrying out a wet-on-wet coating process, a magnetic recording medium having an extemely low orientation property can be prepared by applying a deorientation process under the above-mentioned characteristic conditions.

Also in the case, like Sample Series 3, where two magnetic layers are so multilayered as to be deoriented in a wet-on-wet coating system, the aiming orientation ratio of the upper layer to the lower layer can simultaneously be set at 0.99 to 1.01 according to the above-described method, as is apparent from the above-described results.

What is claimed is:

1. A magnetic recording medium having a non-magnetic support, a non-magnetic layer on said support, and a magnetic layer on said non-magnetic layer, said magnetic layer applied by wet-on-wet coating;
    wherein said non-magnetic layer consists essentially of at least one binder selected from the group consisting of polyvinyl chlorides containing sulfonic groups, vinyl chloride-vinyl acetate copolymers containing sulfonic groups, and polyurethane containing sulfonic groups, 40 to 140 parts by weight of carbon black per 100 parts of said binder, said magnetic layer having a dry thickness of 0.3 to 4.0 μm, and containing ferromagnetic metal particles comprising iron and aluminum or tabular-shaped magnetic particles having an axis of easy magnetization perpendicular to a surface of said tabular particles, and a binder selected from the group consisting of a polyvinyl chloride resin containing sulfonic groups, a vinyl chloride-vinyl acetate copolymer resin containing sulfonic groups and a polyurethane resin containing sulfonic groups.

2. The medium of claim 1 wherein said magnetic layer contains said tabular-shaped magnetic particles and said tabular shaped magnetic particles comprise barium-ferrite of strontium-ferrite.

3. The medium of claim 1, wherein magnetic particles contained in said magnetic layer are oriented by applying a magnetic field after forming said magnetic layer.

* * * * *